United States Patent
Schaser et al.

(10) Patent No.: US 8,894,334 B2
(45) Date of Patent: Nov. 25, 2014

(54) HELICAL ROLLED RING BOLT

(75) Inventors: Robert R. Schaser, Hampshire, IL (US); Daniel A. Dechant, Richmond, KY (US)

(73) Assignee: Illinois Tool Works Inc., Glenview, IL (US)

(*) Notice: Subject to any disclaimer, the term of this patent is extended or adjusted under 35 U.S.C. 154(b) by 218 days.

(21) Appl. No.: 13/311,967

(22) Filed: Dec. 6, 2011

(65) Prior Publication Data

US 2012/0155986 A1 Jun. 21, 2012

Related U.S. Application Data

(60) Provisional application No. 61/424,366, filed on Dec. 17, 2010.

(51) Int. Cl.
*F16B 41/00* (2006.01)
*F16B 33/02* (2006.01)
*B21H 3/02* (2006.01)

(52) U.S. Cl.
CPC ............... *B21H 3/022* (2013.01); *F16B 33/02* (2013.01); *F16B 41/002* (2013.01); *Y10S 411/999* (2013.01)
USPC ............ 411/107; 411/353; 411/413; 411/999

(58) Field of Classification Search
USPC ......... 411/999, 353, 413, 412, 107, 415, 307, 411/411, 308–310
See application file for complete search history.

(56) References Cited

U.S. PATENT DOCUMENTS

| | | | | |
|---|---|---|---|---|
| 2,679,774 A | * | 6/1954 | MacDonald | 470/11 |
| 2,842,180 A | * | 7/1958 | Brown et al. | 411/285 |
| 2,948,317 A | * | 8/1960 | Munro | 411/352 |
| 3,295,874 A | * | 1/1967 | Allen | 403/217 |
| 3,418,013 A | * | 12/1968 | Kelly | 403/22 |
| 4,581,871 A | * | 4/1986 | Blucher et al. | 52/681 |
| 4,959,938 A | * | 10/1990 | De Caro | 52/410 |
| 5,662,444 A | * | 9/1997 | Schmidt, Jr. | 411/369 |
| 5,909,992 A | * | 6/1999 | Wu | 411/387.4 |
| 6,042,314 A | * | 3/2000 | Guelck | 411/399 |
| 6,185,896 B1 | * | 2/2001 | Roberts et al. | 52/537 |
| 6,398,786 B1 | * | 6/2002 | Sesic | 606/308 |
| 7,604,446 B2 | * | 10/2009 | Fonti | 411/399 |
| 2008/0118332 A1 | * | 5/2008 | Lamb | 411/411 |

* cited by examiner

*Primary Examiner* — Flemming Saether
(74) *Attorney, Agent, or Firm* — Paul F. Donovan

(57) ABSTRACT

A ring bolt and a subassembly thereof; the ring bolt having a shank, a first fastening thread extending from a distal end of the shank and a helical ring extending from the fastening thread. The major diameter defined by the helical ring is greater than the major diameter defined by the fastening thread. A component to be captured together with the ring bolt in a subassembly has at least one inward projection in an opening therethrough to define a restricted entrance wider then the major diameter of the fastening thread but smaller than the major diameter of the helical ring.

10 Claims, 4 Drawing Sheets

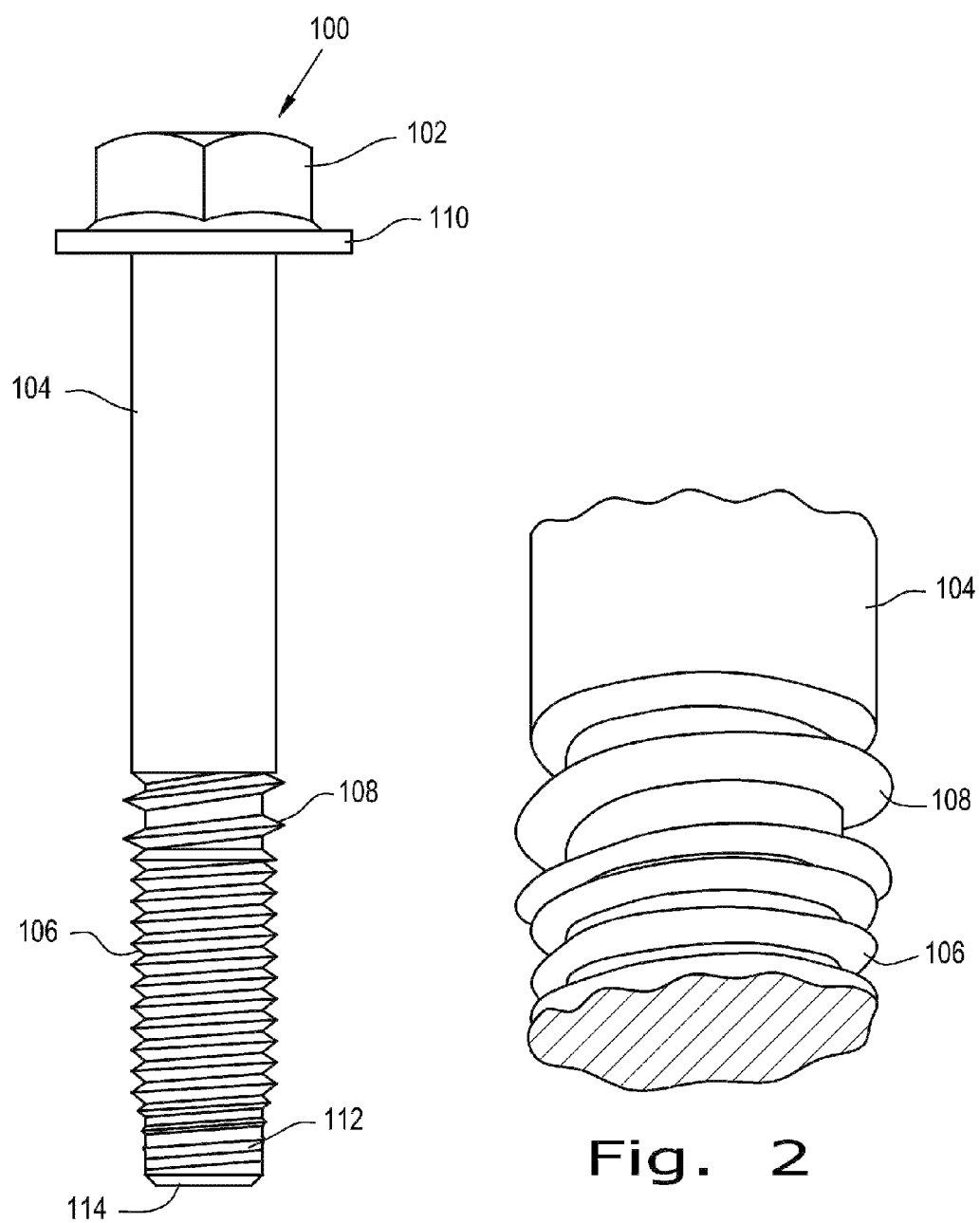

HELICAL ROLLED RING BOLT

CROSS-REFERENCE TO RELATED APPLICATIONS

The present application claims the benefits of U.S. Provisional application Ser. No. 61/424,366 filed on Dec. 17, 2010.

FIELD OF THE INVENTION

The present invention relates generally to bolts used to capture or be captured in components when creating an assembly, and, more specifically, to ring bolts adapted to engage a component in a subassembly to be attached with the bolt in a further assembly.

BACKGROUND OF THE INVENTION

It is known to capture a fastener, such as, for example, a bolt in a first component, such as, for example, a sleeve that subsequently is attached with the bolt to another component in an assembly. A known way to capture the fastener in the first component is to create a subassembly using a ring bolt adapted to be retained in the first component. Known ring bolts have a solid, consistent diameter ring beneath the head of the bolt, between the head of the bolt and the rolled, helically threaded portion of the bolt. Known ring bolts are provided with a ring on the diameter of the shank of the bolt, the ring being a solid, circumferential ring around the shank. The bolt capture creates an assembly between the bolt and a second component, such as a sleeve having indentations on the outside creating projections on the inside that engage the ring on the bolt.

Conventional ring bolts are known to be captured by using a machine or arbor press to push the rolled ring through the sleeve and past the inward projections, which may require several hundred pounds of force. Similar force is required for disassembly, and commonly is not expected or provided that the subassembly of the bolt and first component is disassembled even if the subassembly is removed from the final assembly. Disengagement generally causes undesirable damage to the ring bolt or to the component in which the bolt is held, and the force required often makes disassembly impractical.

In some situations, during servicing of an overall assembly, it would be advantageous to be able to disassemble the ring bolt from the first component without damaging either the ring bolt or first component significantly, so that both can be reused following service of the assembly.

SUMMARY OF THE INVENTION

The present invention improves on known rolled ring designs to create a subassembly between a fastener and another component. The invention provides a threaded fastener that contains a helical rolled ring larger than the major thread diameter, the helical ring being located above the threaded region of the fastener.

The helical ring can be formed efficiently in a cold rolling process forming the threads of the fastener. The helical ring enables quick, efficient and easy capture of the ring bolt in another component, while also enabling disassemble from the component if necessary.

Other features and advantages of the invention will become apparent to those skilled in the art upon review of the following detailed description, claims and drawings in which like numerals are used to designate like features.

BRIEF DESCRIPTION OF THE DRAWINGS

FIG. 1 is an elevational view of a rolled ring bolt;

FIG. 2 is an enlarged fragmentary view of the rolled ring bolt;

Figure 3:
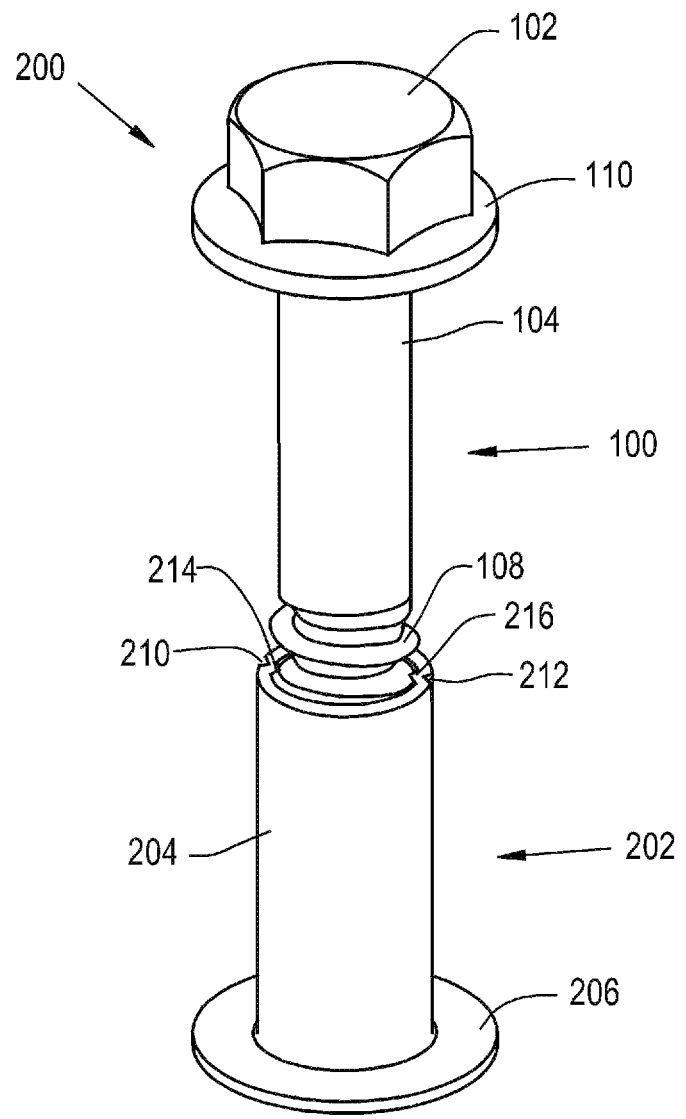
FIG. 3 is a perspective view of a subassembly including the rolled ring bolt.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, numeral 100 designates a male threaded fastener, and more specifically a helical rolled ring bolt 100 having a head 102, a shank 104 and a continuous fastening thread 106 by which ring bolt 100 is fastened within an assembly. A helical ring 108 is provided above fastening thread 106, that is, between head 102 and the proximal end of fastening thread 106. Helical ring 108 cooperates with another component to establish a captured relationship of ring bolt 100 in the other component, as a subassembly for subsequent installation in another device, as will be described subsequently herein.

Head 102 is provided at one end of shank 104. Head 102 can include a flange 110. In the exemplary embodiment, head 102 is configured as a hex-shaped body for engagement by a wrench or other implement or tool for tightening fastener 100. However, it should be understood that other configurations and forms of head 102 can be used. For example, head 102 can be configured for engagement with and by other types of driving implements, including screwdrivers and other drive implements inserted into a properly configured opening in head 102. Further, the outer periphery of head 102 can be configured to engage drivers other than those for hex shapes. Head 102 can also be or include other devices or things for purposes other than driving bolt 100, such as when a loop or other anchor-type element is provided. The simple bolt head structure shown is merely exemplary.

Fastening thread 106 extends along a generally helical path on shank 104 and defines multiple thread pitches, each thread pitch being a helical distance of one full rotation on shank 104. Helical fastening thread 106 includes a lead-in thread portion 112 extending from a distal end 114 of shank 104. In the exemplary embodiment shown, shank 104 includes a blunt distal end 114, but may be of other shapes including rounded or tapered as desirable for a particular application and use of fastener 100.

Fastening thread 106 can be a common screw thread configuration throughout a substantial portion of the overall length of shank 104, or can be along a more limited length of shank 104. Fastening thread 106 can be of single or multiple thread designs and can be at any thread pitch angle. While shown as a right hand thread, it should be understood that a left hand thread also can be used.

Helical fastening thread 106 is formed in a known thread cold rolling process. Helical ring 108 is formed as a helical projection succeeding fastening thread 106 and may be formed as a continuous extension of fastening thread 106 by the thread rolling process. Helical ring 108 may define a single pitch around shank 104 or may define several pitches.

In the exemplary embodiment, helical ring 108 is formed at a steeper angle than fastening thread 106 and includes two pitches. Fastening thread 106 forms a fastening thread major diameter defined by the thread crest thereof. The fastening thread major diameter is indicated by arrowed line 120 in FIG. 4. Helical ring 108 forms a helical ring major diameter defined by the crest thereof. The helical ring major diameter is indicated by arrowed line 122 in FIG. 4. Helical ring major diameter 122 is larger than fastening thread major diameter 120.

Figure 4:
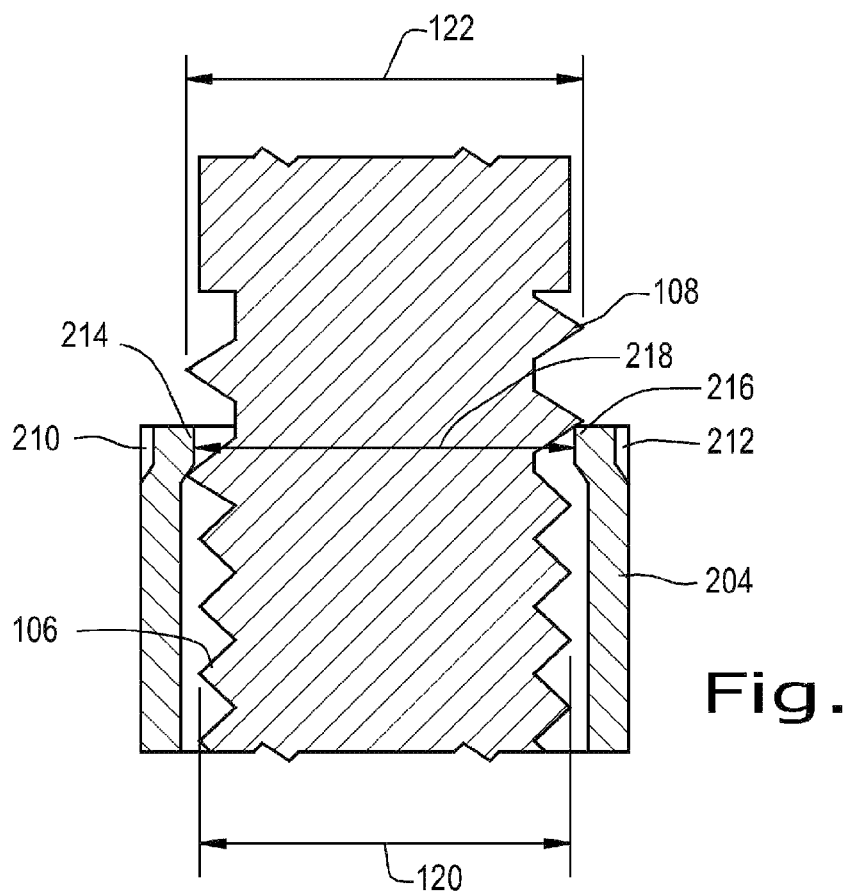
FIG. 4 is a fragmentary, enlarged, cross-sectional view of the subassembly in a first condition of assembly.
Figure 5:
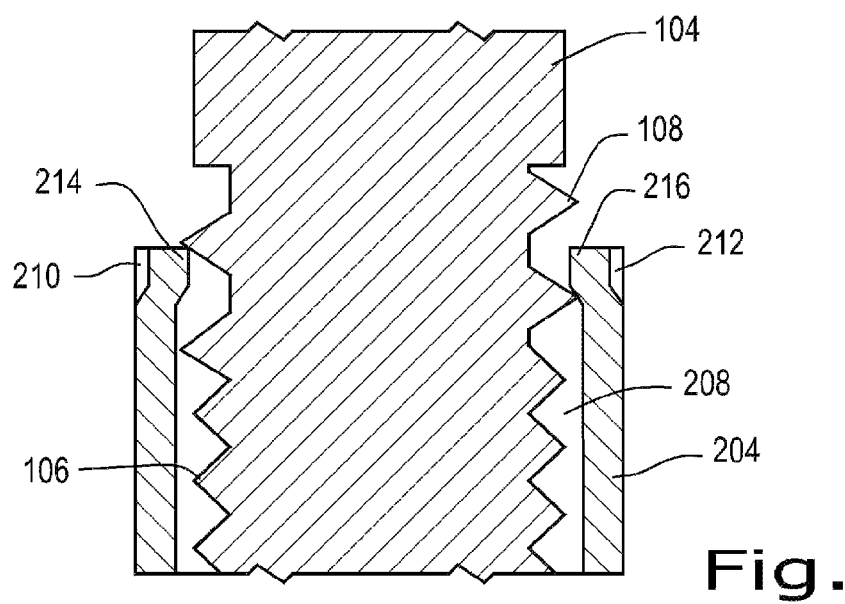
FIG. 5 is a fragmentary, enlarged, cross-sectional view of the subassembly in a second condition of assembly.

FIGS. 3-5 illustrates a subassembly 200 that includes bolt 100 and a female component 202 having capture geometry cooperating with helical ring 108 to establish a captured relationship between bolt 100 and component 202. In the exemplary embodiment, component 202 is a sleeve 202 including a tube 204 and a base 206 that define an axial opening 208 there through. Near the end of tube 204 opposite base 206, first and second indentations 210, 212 are formed by punching or pressing from the outer surface of tube 204. Accordingly, protrusions 214, 216 are formed in axial opening 208. In the exemplary embodiment, two indentations 210, 212 are formed diametrically opposite one another in tube 204. It should be understood that in some situations and uses, a single indentation with corresponding protrusion can be used, or more than two indentations with corresponding protrusions can be used. The open dimension between protrusions 214, 216 defines a restricted entrance in axial opening 208, the dimension of which is indicated by arrowed line 218 in FIG. 4.

Fastening thread major diameter 120 is less then the dimension of restricted entrance 218, such that fastening thread 106 can pass between protrusions 214, 216 without interference. However, helical ring major diameter 122 is greater than the dimension of restricted entrance 218, and helical ring 108 will not pass freely between protrusions 214, 216. The widths of protrusions 214, 216 are such as to fit between adjacent pitches of helical ring 108. Accordingly, rotation of bolt 100 causes protrusions 214, 216 to enter the distal end of helical ring 108, and allows helical ring 108 to pass along protrusions 214, 216 until the protrusions emerge from the proximal end of helical ring 108. In this way, bolt 100 is threaded into sleeve 202 until helical ring 108 is rotated through restricted entrance 218, until helical ring 108 is completely beyond protrusions 214, 216. Subassembly 200 is thereby established with bolt 100 captured in sleeve 202, with the two remaining together awaiting final installation. Bolt 100 is captured in sleeve 202, and a proscribed axial force will not easily dislodge bolt 100 from sleeve 202. However, subassembly 200 can be disassembled by reverse rotation of bolt 100 to allow helical ring 100 to pass along protrusions 214, 216 in the opposite direction, causing protrusions 214, 216 to enter the proximal end of helical ring 108 and to subsequently emerge from the distal end of helical ring 108.

Figure 6:
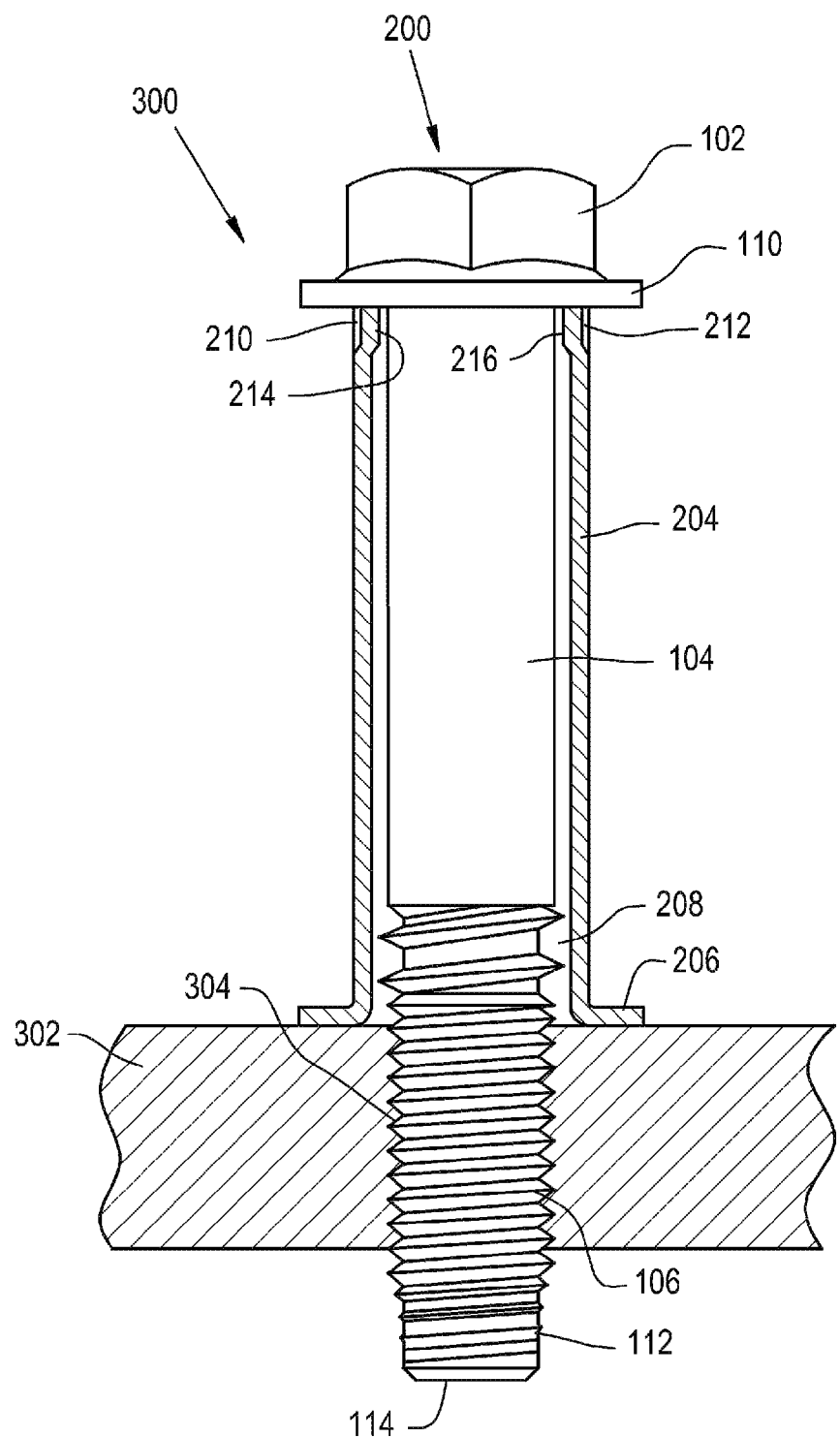
FIG. 6 is a cross-sectional view of the subassembly installed in an overall assembly.

FIG. 6 illustrates a final assembly 300 which includes a further component 302 having a threaded aperture 304 therein. Subassembly 200 is connected to further component 302 by threaded engagement of fastening thread 106 in threaded aperture 304. Base 206 is held firmly against a surface of further component 304, with the opposite end of tube 204 confronted by flange 110.

Should it becomes necessary or desirable to remove bolt 100 from sleeve 202, subassembly 200 can be removed from final assembly 300 by disengaging fastening thread 106 from threaded aperture 304. To remove bolt 100 from sleeve 202, bolt 100 is rotated in the opposite direction through restricted entrance 218 until completely beyond protrusions 214, 216, as described previously.

The sizes and number of indentations, and the diameter and pitch angle of the helical ring all can be selected or tuned to achieve desired torque requirements to effect the capture of the bolt in the component. During manufacture, the helical ring can be rolled above the thread during a cold forming process in a single pass through a thread roller along with the thread, so efficiency is not disrupted.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A fastener assembly comprising:
  a male threaded fastener having a head, a shank with a distal end, a non-tapering unthreaded shank portion beneath said head, a fastening thread and a helical ring on said shank, said fastening thread disposed between said distal end and said helical ring, said helical ring being an extension of said fastening thread and said helical ring having at least one pitch;
  said fastening thread defining a first major diameter and said helical ring defining a second, single major diameter, said first major diameter being less than said second major diameter; and
  a female component configured to threadably receive said male threaded fastener therein and having an inward projection defining a restricted entrance greater than said first major diameter and less than said second major diameter.

2. The fastener assembly of claim 1, said helical ring being at a steeper pitch angle than said fastening thread.

3. The fastener assembly of claim 2, said helical ring including multiple thread pitches.

4. The fastener assembly of claim 1, said female component including a tube defining an axial opening therethrough.

5. The fastener assembly of claim 4, said tube having two protrusions in said axial opening defining said restricted entrance.

6. The fastener assembly of claim 5, said protrusions being diametrically opposite each other.

7. The fastener assembly of claim 1, said helical ring following continuously from said fastening thread.

8. A fastener assembly comprising:
a male threaded fastener having a shank with a distal end, a fastening thread and a helical ring on said shank, said fastening thread disposed between said distal end and said helical ring;
said fastening thread defining a first major diameter and said helical ring defining a second major diameter, said first major diameter being less than said second major diameter; and
a female component configured to receive said male threaded fastener therein, said female component including a tube defining an axial opening therethrough, and said tube having a protrusion in said axial opening defining a restricted entrance greater than said first major diameter and less than said second major diameter.

9. The fastener assembly of claim 8, said tube having two protrusions in said axial opening defining said restricted entrance.

10. The fastener assembly of claim 9, said protrusions being diametrically opposite each other.

* * * * *